United States Patent
Yoshino

(10) Patent No.: US 12,407,628 B2
(45) Date of Patent: Sep. 2, 2025

(54) INPUT/OUTPUT SWITCH AND COMMUNICATION SYSTEM

(71) Applicant: NIPPON TELEGRAPH AND TELEPHONE CORPORATION, Tokyo (JP)

(72) Inventor: Manabu Yoshino, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 285 days.

(21) Appl. No.: 18/018,716

(22) PCT Filed: Jul. 31, 2020

(86) PCT No.: PCT/JP2020/029390
§ 371 (c)(1),
(2) Date: Jan. 30, 2023

(87) PCT Pub. No.: WO2022/024331
PCT Pub. Date: Feb. 3, 2022

(65) Prior Publication Data
US 2023/0224260 A1    Jul. 13, 2023

(51) Int. Cl.
*H04L 49/1515*    (2022.01)
*H04L 49/00*    (2022.01)
*H04L 49/253*    (2022.01)

(52) U.S. Cl.
CPC ........ *H04L 49/1515* (2013.01); *H04L 49/253* (2013.01); *H04L 49/70* (2013.01)

(58) Field of Classification Search
CPC ... H04L 49/1515; H04L 49/253; H04L 49/70; H04L 49/15; H04L 49/30; H04L 49/40; H04L 12/12
See application file for complete search history.

(56) References Cited

U.S. PATENT DOCUMENTS 9,008,510 B1 *   4/2015  Zhao ................... H04L 49/1515
                                                          398/19
2016/0352622 A1 * 12/2016  Gautam ................. H04L 45/66

OTHER PUBLICATIONS

Toru Mano et al., "Increasing Capacity of the Clos Structure for Optical Switching Networks", 2019 IEEE Global Communications Magazine (Globecom), IEEE, 2019.

* cited by examiner

*Primary Examiner* — Mohamed A Kamara
(74) *Attorney, Agent, or Firm* — Harness, Dickey & Pierce, P.L.C.

(57) ABSTRACT

An aspect of the present invention provides an input/output switch including: a plurality of virtual switches formed by asymmetrically divided switches with symmetrically aligned ports; and ports on a side of end points and ports on a side of an intermediate switch allocated for each of the virtual switches, in which some of the ports of the virtual switches on the side of the end points act as ports that form a path that returns traffic among the virtual switches.

5 Claims, 15 Drawing Sheets

801-1
P=N'+k lines
Q=M' lines
M'
N'
M'
N'

803-1
803-2
NU NU NU NU NU NU NU NU

802-1
802-2

805-1

810

TO RELAY NETWORK p q
q p

806
PATH SETTING UNIT

SUBSCRIBER DEVICE
Endpoints

INPUT/OUTPUT SW (IOSW)
Input-Output layer

INTERMEDIATE SW
Intermedium layer

STATION DEVICE

INPUT/OUTPUT SWITCH AND COMMUNICATION SYSTEM

CROSS-REFERENCE TO RELATED APPLICATIONS

This application is a 371 U.S. National Phase of International Application No. PCT/JP2020/029390, filed on Jul. 31, 2020. The entire disclosure of the above application is incorporated herein by reference.

TECHNICAL FIELD

The present invention relates to technologies for an input/output switch and communication system.

BACKGROUND ART

Non-blocking networks have been applied to various fields such as telephone networks, asynchronous transfer mode (ATM) networks, wavelength division multiplexing optical networks, and time division packet switching. A Clos network is a practical approach for constructing a non-blocking network.

A Clos network consists essentially of three stages, namely, an input stage, an intermediate stage, and an output stage. In a folded Clos network, the input stages and the output stages are integrated in the same input/output switch. In the folded Clos network, one side of the input/output switch is usually connected to a line on the side of subscriber equipment (end point), and the other side is connected to a line on the side of the intermediate switch. However, if an input/output switch in the folded Clos network in which ports are symmetrically aligned is used, an excess occurs in an input/output port on the side of the subscriber equipment, and port utilization efficiency is thus degraded. To solve such a problem, a technique for improving port utilization efficiency by dividing an input/output switch into two virtual switches when a folded Clos network is constructed is disclosed in NPL 1.

CITATION LIST

Non Patent Literature

[NPL 1] T. Mano, T. Inoue, K. Mizutani and O. Akashi, "Increasing Capacity of the Clos Structure for Optical Switching Networks," 2019 IEEE Global Communications Conference (GLOBECOM)

SUMMARY OF INVENTION

Technical Problem

As described in NPL 1, port utilization efficiency is improved by dividing the input/output switch into the two virtual switches. However, further improvement in port utilization efficiency has been desired.

In view of the aforementioned circumstances, an object of the present invention is to provide a technique for enabling port utilization efficiency to be improved in a folded Clos network in which transfer is performed in a non-blocking manner.

Solution to Problem

An aspect of the present invention provides an input/output switch including: a plurality of virtual switches formed by asymmetrically divided switches with symmetrically aligned ports; and ports on a side of end points and ports on a side of an intermediate switch allocated for each of the virtual switches, in which some of the ports of the virtual switches on the side of the end points act as ports that form a path that returns traffic among the virtual switches.

An aspect of the present invention provides an input/output switch including: a plurality of virtual switches formed by asymmetrically divided switches with symmetrically aligned ports; and ports on a side of end points and ports on a side of an intermediate switch allocated for each of the virtual switches, in which some of the ports of the virtual switches on the side of the end points and of the ports on the side of the intermediate switch function as ports that form a path directly coupled to a relay network.

An aspect of the present invention provides an input/output switch including: a plurality of virtual switches formed by asymmetrically divided switches with symmetrically aligned ports; and ports on a side of end points and ports on a side of an intermediate switch allocated for each of the virtual switches, in which some of the ports of the virtual switches on the side of the end points act as ports that form a path that returns traffic among the virtual switches, and some of the ports of the virtual switches on the side of the end points and of the ports on the side of the intermediate switch act as ports that form a path directly coupled to a relay network.

An aspect of the present invention provides a communication system including: a folded Clos network that includes the aforementioned input/output switch.

Advantageous Effects of Invention

According to the present invention, it is possible to improve port utilization efficiency in a folded Clos network in which transfer is performed in a non-blocking manner.

BRIEF DESCRIPTION OF DRAWINGS

FIG. 11 is an explanatory diagram of an overview of a communication system according to an eighth embodiment of the present invention.

DESCRIPTION OF EMBODIMENTS

Hereinafter, an embodiment of the present invention will be described with reference to the drawings. A communication system according to an embodiment of the present invention constructs a folded Clos network that performs transferring in a non-blocking manner. The folded Clos network is configured of an input/output switch (IOSW) and an intermediate switch. First, the input/output switch that is a basic configuration of the present invention will be described.

<Switch configuration A>

Figure 1:
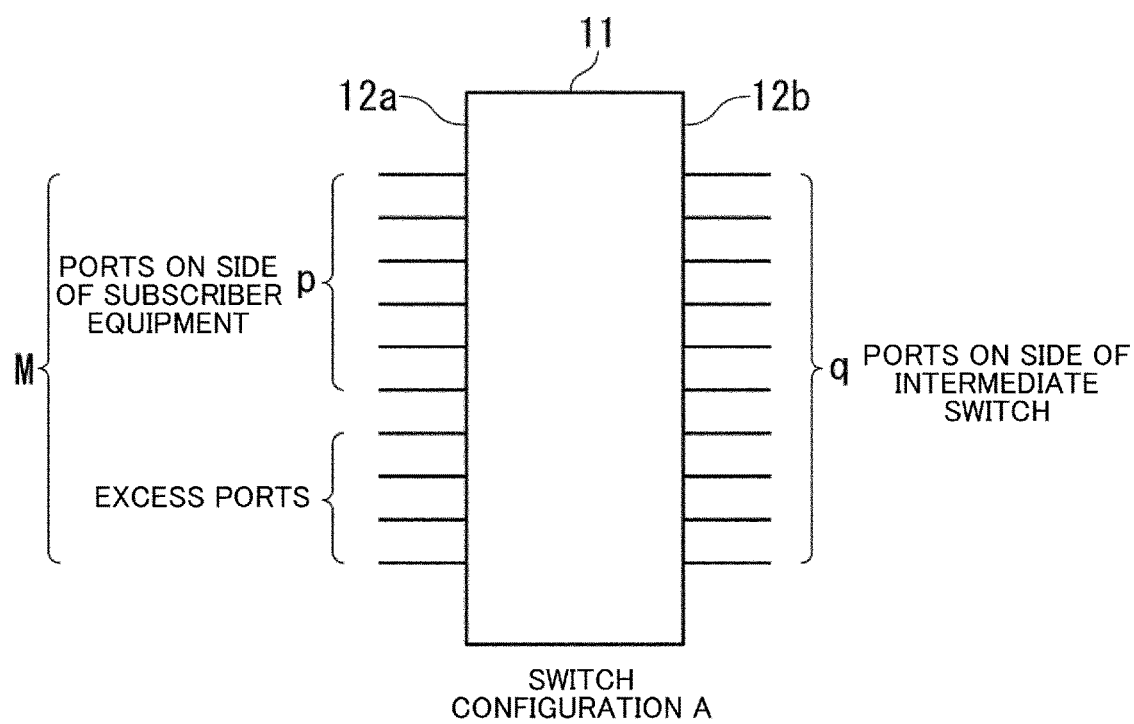
FIG. 1 is an explanatory diagram of an input/output switch which is a basic configuration of the present invention.
Figure 2:
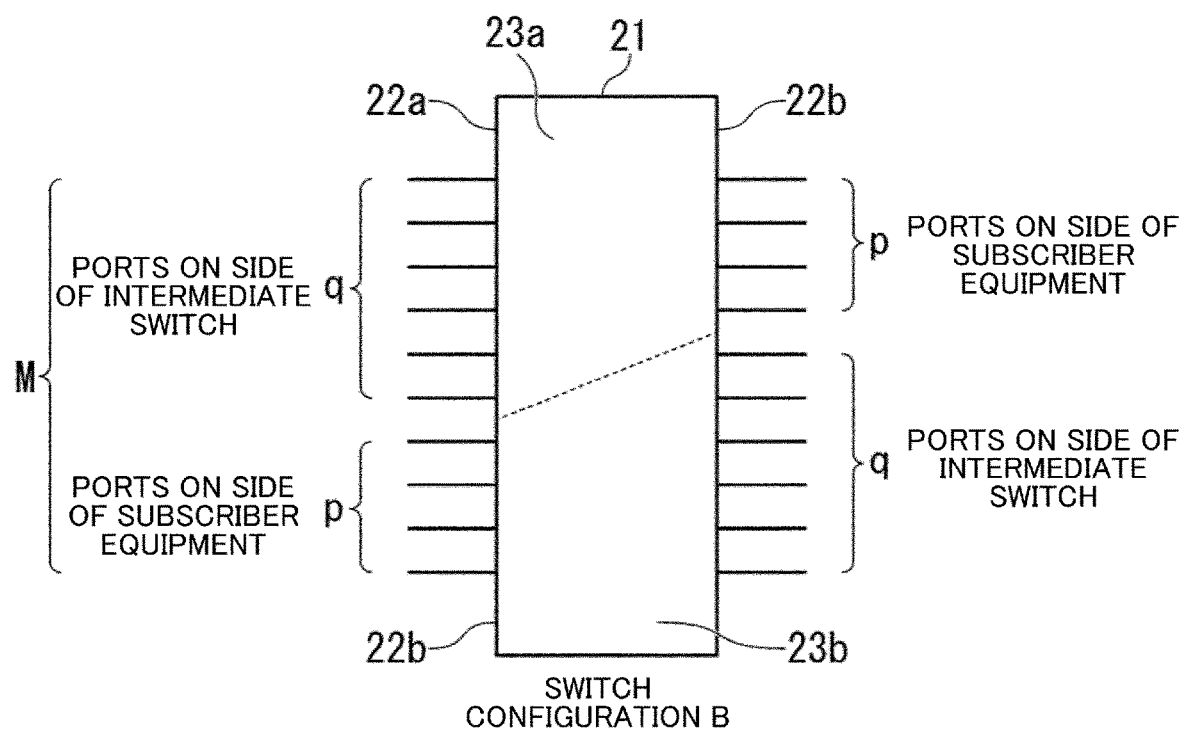
FIG. 2 is an explanatory diagram of the input/output switch which is the basic configuration of the present invention.
Figure 3:
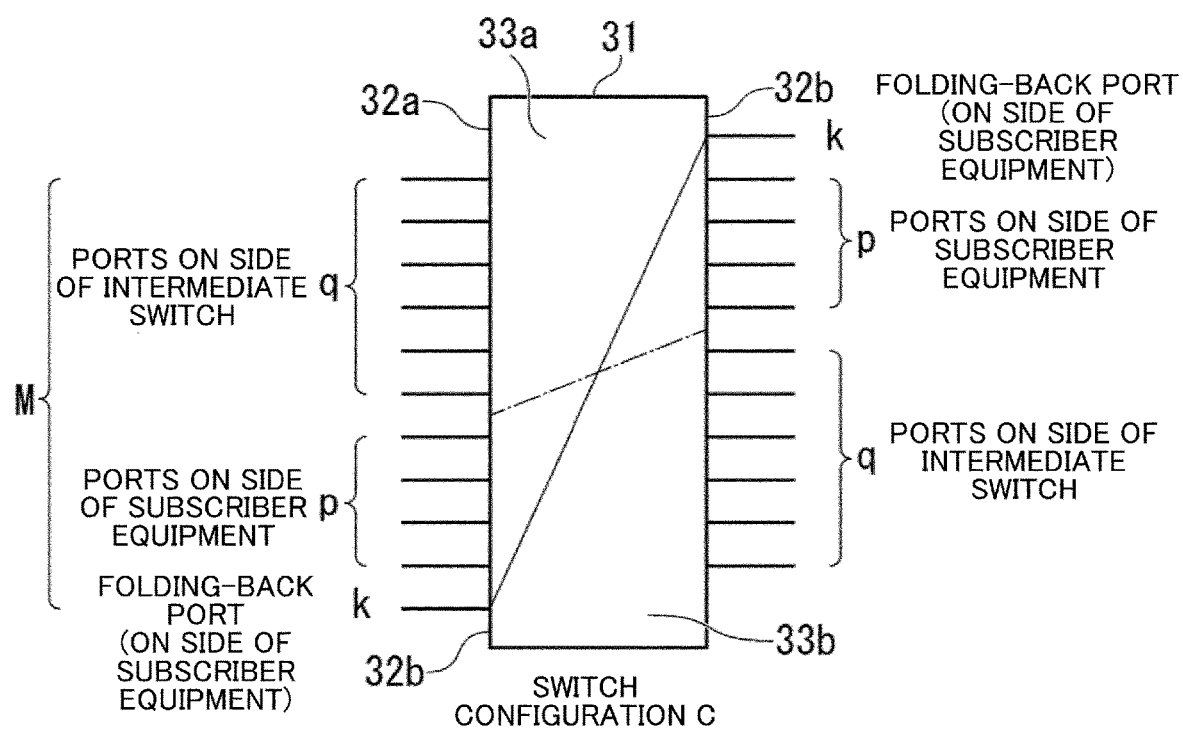
FIG. 3 is an explanatory diagram of the input/output switch which is the basic configuration of the present invention.

FIGS. 1, 2 and 3 are explanatory diagrams of the input/output switch that is a basic configuration of the present invention. FIG. 1 is the most basic part of the input/output switch in a case in which a folded Clos network is configured. This configuration will be referred to as a switch configuration A below.

As illustrated in FIG. 1, an input/output switch 11 has similar ports disposed symmetrically on one side 12a and the other side 12b. Note that the input/output switch 11 may be a grid-type N×M matrix switch, may be of a triangular grid type, a planar type, or a torus-type, or may be a banyan network, for example. In a case of an optical switch, any of a space division type, a time division type, a wavelength division type, and a free space type may be used. In the switch configuration A, one side 12a of the input/output switch 11 is a port on the side of end points, and the other side 12b is a port on the side of the intermediate switch.

Although an example of constraint conditions and efficiency in a configuration in which IOSW allows connection of the maximum number of intermediate switches will be described below, the same applies to a case other than the configuration in which the maximum number of intermediate switches are connected, that is, a case in which multiple connections are established from one IOSW to a port on one side of one intermediate switch.

In the switch configuration A, when the number of lines on the side of the end point is defined as p and the number of lines on the side of the intermediate switch is defined as q in the configuration in which the maximum number of intermediate switches are connected, the constraint condition for performing transferring in a non-blocking manner is as follows.

$$q \geq 2(p-1) \quad (11)$$

Therefore, the number M of ports of the input/output switch 11 is as follows.

$$M \geq q \geq 2(p-1) \quad (12)$$

In general, when the number of intermediate switches is defined as L, $2[(p-1)/q]+1 \leq L$, where is a Gauss symbol, In order to perform transferring in a non-blocking manner, the number q of lines on the side of the intermediate switch is larger than the number p of lines on the side of the end point. Therefore, when lines from the ports on the side of the end point are connected to one side 12a of the input/output switch 11, and lines from the side of the intermediate switch are connected to the other side 12b as illustrated in FIG. 1, an excess occurs in the ports on the side of the end point on the one side 12a.

In the switch configuration A, port utilization efficiency at the time of an equal sign (port utilization efficiency=the number of used ports/total number of ports) is as follows, on the basis of Expression (12).

$$p/M = p/(2p-2) \text{ to } 0.5 \quad (13)$$

<Switch Configuration B>

FIG. 2 illustrates an input/output switch in a case of configuring a folded Clos network, in which port utilization efficiency is improved by dividing the input/output switch with asymmetrically disposed ports into two asymmetric virtual switches. This configuration will be referred to as a switch configuration B below.

As illustrated in FIG. 2, an input/output switch 21 is used by being virtually divided into two virtual switches 23a and 23b. In the switch configuration B, ports on one side 22a and ports on the other side 22b of the input/output switch 21 are allocated to ports on the side of the end point and the ports on the side of the intermediate switch such that a constraint restriction for performing transferring in a non-blocking manner is satisfied.

In other words, when the number of lines on the side of the end point is defined as p and the number of lines on the side of the intermediate switch is defined as q as described above, the constraint condition for performing transferring in a non-blocking manner is as follows.

$$q \geq 2(p-1) \quad (21)$$

In the switch configuration B, the added value (p+1) of the number p of the lines on the side of the end point and the number q of the lines on the side of the intermediate switch is the number M of the ports of the input/output switch. Therefore, the restriction condition of the number M of ports for performing transferring in a non-blocking manner is as follows.

$$M \geq p + 2(p-1) = 3p - 2 \quad (22)$$

Port utilization efficiency at the time of an equal sign is as follows in the case of the switch configuration B on the basis of Expressions (21) and (22).

$$2p/M = 2p/(3p-2) \text{ to } 0.66 \quad (23)$$

As described above, according to the switch configuration B, it is possible to improve port utilization efficiency by virtually dividing the input/output switch 21 into the two virtual switches 23a and 23b, and allocating the ports on the one side 22a and the other side 22b to the ports on the side of the end point and the ports on the side of the intermediate switch such that the constraint condition for performing transferring in a non-blocking manner is satisfied.

<Switch Configuration C>

FIG. 3 illustrates the switch configuration B to which return ports for achieving returning among the virtual switches is further allocated. This configuration is a further improved switch configuration B and is a basic configuration of the present invention. This configuration will be referred to as a switch configuration C below.

As illustrated in FIG. 3, an input/output switch 31 is used by being virtually divided into two asymmetric virtual switches 33a and 33b in the switch configuration C. This configuration is similar to the switch configuration B illustrated in FIG. 2. Further, the switch configuration C is provided with return ports that form paths for achieving returning with no intervention of the intermediate switch between the two virtual switches 33a and 33b. The number of the return ports corresponding to the number of ports in accordance with traffic to be returned between the divided virtual switches 33a and 33b are provided at the ports on the side of the end point. In other words, some of the ports on the side of the end points act as the aforementioned return ports.

In the case of two input/output switches 31 (four virtual switches) on the assumption that lines are equally distributed, for example, [p/4] (=k, [ ]: Gauss sign) traffic is transferred between the virtual switch 33a and the virtual switch 33b without any intervention of the ports on the side of the intermediate switch among the p ports on the side of the end point.

As described above, when the number of lines on the side of the end point is defined as p and the number of lines on the side of the intermediate switch is defined as q as described above, the constraint condition for performing transferring in a non-blocking manner is as follows.

$$q \geq 2(p-1) \tag{31}$$

In the switch configuration C, [p/4] is transferred in the same input/output switch 31. Therefore, the number p of lines on the side of the subscriber equipment in Expression (31) may be (p−[p/4]). Thus, the condition for performing transferring in a non-blocking manner is as follows in the switch configuration (C).

$$q \geq 2(p-[p/4]-1)=1.5p-1.5p-2 \tag{32}$$

Therefore, port utilization efficiency at the time of an equal sign is as follows in the switch configuration C.

$$M \geq p + k + q \tag{33}$$
$$= p + p/4 + (1.5p - 2)$$
$$= (11p/4) - 2$$

As described above, the input/output switch 31 is virtually divided into the two virtual switches 33a and 33b, and the return ports for achieving returning without any intervention of the intermediate switch between the two virtual switches 33a and 33b are further provided in the switch configuration C. It is thus possible to improve port utilization efficiency. On the assumption that (128×128) is satisfied in the input/output switch 31, the number p of the subscriber lines increases from (p=43) to (p=47), and the maximum number of subscribers also increases when the returning between the virtual switches 32a and 32b is always half.

First Embodiment

Figure 4:
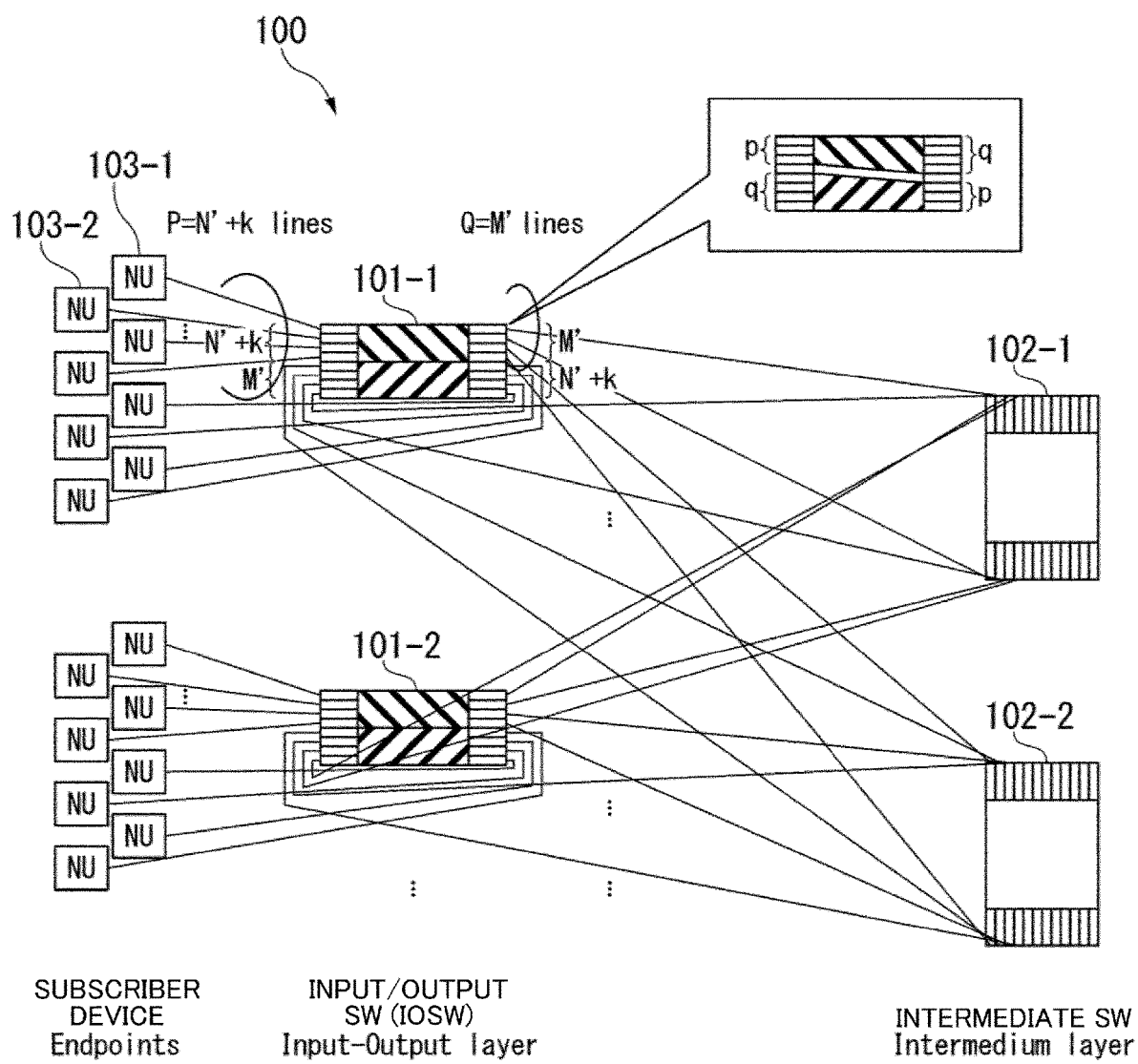
FIG. 4 is an explanatory diagram of an overview of a communication system according to a first embodiment of the present invention.

Next, a specific example of an embodiment of the present invention will be described. FIG. 4 is an explanatory diagram of an overview of a communication system 100 according to a first embodiment of the present invention.

The communication system 100 according to the first embodiment is configured of input/output switches 101-1, 101-2, ..., intermediate switches 102-1, 102-2, ..., and subscriber equipment 103-1, 103-2, ... and realizes a folded Clos network. The subscriber equipment 103-1, 103-2, ... is end points and is, for example, optical network units (ONUs). Note that although the communication system 100 is an optical network in this example, the present invention is not limited thereto.

In the communication system 100 according to the first embodiment of the present invention, input/output switches that are similar to those with the aforementioned switch configuration C are used as the input/output switches 101-1, 101-2, ..., In other words, as the input/output switch with the switch configuration C, one switch is divided into two virtual switches, and a return port is further provided, as illustrated in FIG. 3. The return ports form a path that returns traffic among the virtual switches from the side of the subscriber equipment 103-1, 103-2, ... to the side of the subscriber equipment 103-1, 103-2, ....

Here, the number of lines of each of the input/output switches 101-1, 101-2, ... on the side of the subscriber equipment is defined as p, the number of lines on the side of the intermediate switch is defined as q, and the number of lines for returning traffic is defined as k. In a case in which the input/output switch with the switch configuration A illustrated in FIG. 1 is used, when the number of ports of the input/output switch is defined as M, a constraint condition for performing transferring in a non-blocking manner is as follows.

$$q \geq 2(p-1)$$

$$M \geq q \geq 2(p-1)$$

In the case of using the switch configuration A, port utilization efficiency at the time of an equal sign in the above expression is as follows.

$$p/M = p/(2p-2) \text{ to } 0.5 \tag{41}$$

On the other hand, when the input/output switch with the switch configuration B illustrated in FIG. 2 is used, the constraint condition for performing transferring in a non-blocking manner is as follows.

$$q \geq 2(p-1)$$

$$M \geq p + 2(p-1) = 3p - 2$$

In this case, port utilization efficiency at the time of an equal sign is as follows.

$$2p/M = 2p/(3p-2) \text{ to } 0.66 \tag{42}$$

On the other hand, the input/output switches 101-1, 101-2, ... with the switch configuration C illustrated in FIG. 3 are used in the present embodiment. When the number of return ports is defined as k, the constraint condition for performing transferring in a non-blocking manner is as follows.

$$q \geq 2(p-1)$$

$$M \geq p + q + k \geq p + 2(p-1) + k = 3p - 2 + k$$

In this case, port utilization efficiency at the time of an equal sign is as follows.

$$2(p+k)/(3p-2+k) \tag{43}$$

Port utilization efficiency is compared between the case in which the switch configuration B is used and the case in which the present embodiment (switch configuration C) is used, a difference (Expression (43)-Expression (42)) in port utilization efficiency is as follows.

$$2(p+k)/(3p-2+k) - 2p/(3p-2) \quad (44)$$
$$= [(2p: k)(3p-2) - 2p(3p-2+k)]/[(3p-2)(3p-2: k)]$$
$$= k(5p-4)/[(3p-2)(3p-2; k)]$$

According to Expression (44), port utilization efficiency is more improve in the present embodiment using the switch configuration (C) than in the case in which the switch configuration B is used when p≥1.

Port utilization efficiency when M=8 is compared, the following results are obtained.

In the case of the switch configuration A: p/M≤5/8=0.625
In the case of the switch configuration B: 2p/M≤3×2/8=0.75
In the case of the present embodiment (switch configuration C): 2(p+k)/M≤2×(3+1)/8=1.

Note that although not illustrated, ports that are coupled directly to a relay network from an intermediate layer SW (the intermediate switch 102, for example) may be included.

This ports are provided separately from the ports connected to the IOSW.

The ports of an intermediate layer SW coupled directly to the relay network are connected to the ports of the intermediate layer SW connected to ports of the counterpart IOSW in the intermediate layer.

In a case of the Clos network: one of the two ports that connect to the subscriber equipment on the path of the subscriber equipment-IOSW-the intermediate layer SW-IOSW-the subscriber equipment is connected to the relay network, instead of connecting to the subscriber equipment.

The use of ports directly coupled to the relay network, as indicated by a route made up of subscriber equipment-IOSW-intermediate layer SW-relay network, reduces the number of intervening SWs (switches) and improves network efficiency. Alternatively, ports for connection to one or more IOSWs may be diverted. In a case in which counterpart ports of the intermediate layer SW are diverted in units of sets, it is desirable to configure a system to satisfy the constraint condition by adding the number of ports from the IOSWs in accordance with the number of ports corresponding to the number of the diverted ports used without performing calculation there is a half of the paths in terms of the design of the IOSW path in the case of the asymmetric configuration, and in this case, non-blocking can be maintained with a constraint expression similar to that before the diversion. The same also applies to the following examples.

Second Embodiment

Figure 5:
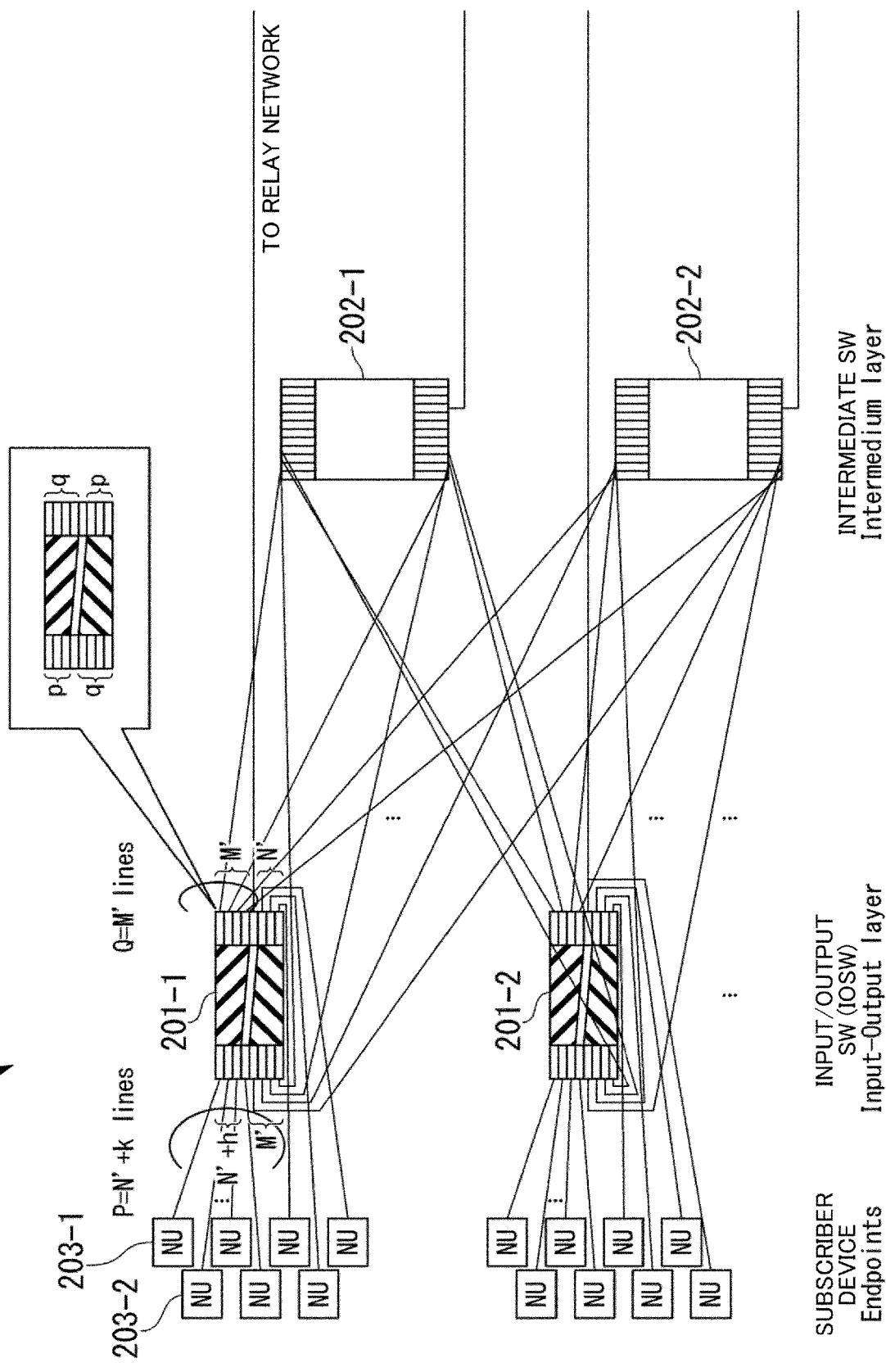
FIG. 5 is an explanatory diagram of an overview of a communication system according to a second embodiment of the present invention.

FIG. 5 is an explanatory diagram of an overview of a communication system 200 according to a second embodiment of the present invention. In FIG. 5, the communication system 200 according to the second embodiment of the present invention includes input/output switches 201-1, 201-2, . . . intermediate switches 202-1, 202-2, . . . and subscriber equipment 203-1, 203-2, . . . and realizes a folded Clos network. The subscriber equipment 203-1, 203-2, . . . are end points and are, for example, ONUs.

In the communication system 200 according to the second embodiment of the present invention, each of the input/output switches 201-1, 201-2, . . . . Is divided into two virtual switches. Moreover, each of the input/output switches 201-1, 201-2, . . . includes a relay network port that is coupled directly to a relay network from the subscriber equipment 203-1, 203-2, . . . without any intervention of the intermediate switches 202-1, 202-2, . . . , The same number of relay network ports are provided on each of the side of the subscriber equipment and the side of the intermediate switch of the input/output switches 201-1, 201-2, . . . .

The drawing includes a relay network port from subscriber equipment side to intermediate switch side is equipped for one virtual switch, parallel to routes of relay network ports on the subscriber device side and the intermediate switch side. However, it is preferable to include relay network ports that are parallel to a set of the ports of both the virtual switches from the viewpoint of leveling the number of ports to be connected to the subscriber equipment between the virtual switches. The reason is that it is easy to manage a configuration in which the ports on the side of the subscribers that are connected to the subscriber equipment and are also included in the first embodiment and the relay network ports on the side of the subscribers that are connected to the subscriber equipment are arbitrarily connected without any distinction therebetween. Also, the reason is that it is easy to employ a configuration in which the ports on the side of the intermediate switch that are connected to the intermediate switch and are also included in the first embodiment and the relay network ports on the side of the intermediate switch that are connected to the relay network are arbitrarily connected without any distinction therebetween, in terms of management.

In the present embodiment, when the number of sets of the relay network ports coupled directly to the relay network from the subscriber equipment is defined as h, the constraint condition for performing transferring in a non-blocking manner is as follows.

$$M \geq (p+h) + q$$
$$= p + (q+h) \geq p + 2(p-1) + h$$
$$= 3p - 2 + h$$

Port utilization efficiency at the time of an equal sign in the present embodiment is as follows.

$$(2p+h)/(3p-2+h) \quad (51)$$

Port utilization efficiency in the case in which the switch configuration B illustrated in FIG. 2 is used and port utilization efficiency in the case in which the configuration according to the present application is used are compared, a difference in the port utilization efficiency (Expression (51)- Expression (42)) is as follows.

$$(2p+h)/(3p-2+k) - 2p/(3p-2)$$
$$= [(2p+h)(3p-2) - 2p(3p-2+h)]/[(3p-2)(3p-2: k)]$$
$$= k(p-2)/[(3p-2)(3p-2: k)]$$

Therefore, port utilization efficiency in the present embodiment is more satisfactory when P≥p than in the case in which the switch configuration B is used.

Port utilization efficiency when M=8 is compared, the following results are obtained.

In the case of the switch configuration A: p/M≤5/8=0.625
In the case of the switch configuration B: 2p/M≤3×2/8=0.75

In the case of the first embodiment: $2(p+k)/M \geq 2 \times (3+1)/8 = 1$.

In the case of the second embodiment: $(2p+h)/M \leq (2 \times 3+1)/8 = 0.875$

In the present embodiment, it is possible to reduce utilization of ports to the intermediate switch, which are about a double of the ports on the side of the subscribers, and thereby to improve utilization efficiency by providing the relay network ports that are coupled directly to the relay network from the subscriber equipment 203-1, 203-2, .... Note that as illustrated in the drawing, the ports that are coupled directly to the relay network from the intermediate switch 202 may be provided.

Third Embodiment

Figure 6:
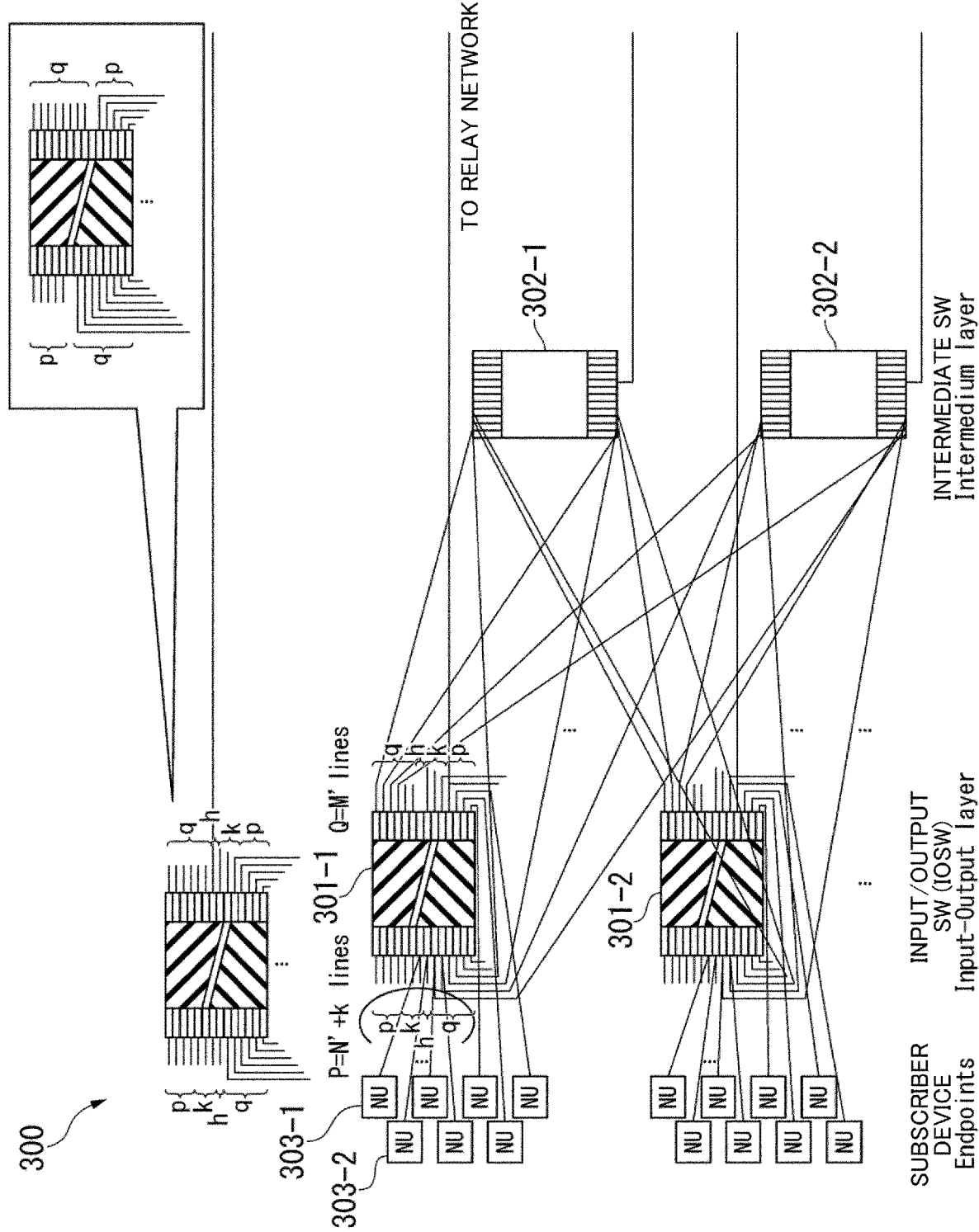
FIG. 6 is an explanatory diagram of an overview of a communication system according to a third embodiment of the present invention.

FIG. 6 is an explanatory diagram of an overview of a communication system 300 according to a third embodiment of the present invention. The communication system 300 according to the third embodiment of the present invention includes input/output switches 301-1, 301-2, ..., intermediate switches 302-1, 302-2, ..., and subscriber equipment 303-1, 303-2, ... and realizes a folded Clos network. The subscriber equipment 303-1, 303-2, ... are end points and are, for example, ONUs.

In the communication system 300 according to the third embodiment of the present invention, one switch is divided into two virtual switches as input/output switches 301-1, 301-2, ..., return ports for returning between the virtual switches is provided, and further, relay network ports that are coupled directly to the relay network from the subscriber equipment are added. Note that as illustrated in the drawing, the ports that are coupled directly to the relay network from the intermediate switch 302 may be provided.

When the number of return ports for returning between the virtual switches is defined as k, the number of relay network ports that are coupled directly to the relay network from the subscribers is h, and the number of ports of the input/output switch is M, the constraint condition for performing transferring in a non-blocking manner is as follows.

$$M \geq (p + k + h) + q$$
$$= p + k + (q + h)$$
$$\geq p + k + 2(p - 1) + h$$
$$= 3p - 2 + k + h$$

Port utilization efficiency at the time of an equal sign in the above expression is as follows.

$$(2(p+k)+h)/(3p-2+k+h) \quad (61)$$

Port utilization efficiency in the case in which the switch configuration B illustrated in FIG. 2 is used and port utilization efficiency in the case in which the present embodiment is used are compared, a difference in the port utilization efficiency (Expression (61)-Expression (42)) is as follows.

$$(2(p+k)+h)/(3p-2+k+h) - 2p/(3p-2) \quad (62)$$
$$= [(2p+2k+h)(3p-2) - 2p(3p-2+k+h)]/[(3p-2)(3p-2+k+h)]$$
$$= [4k(p-1) + h(p-2)]/[(3p-2)(3p-2+k+h)]$$

From Expression (62), port utilization efficiency in the present embodiment is more satisfactory when $p>2$ than that in the case in which the switch configuration B illustrated in FIG. 2 is used.

In the present embodiment, port utilization efficiency when M=14, k=3, and h=1 is as follows.

$$(2(p+k)+h)/(3p-2+k+h)$$
$$= (2 \times (4+3) + 1)/(3 \times 4 - 2 + 3 + 1)$$
$$= 15/14 > 1$$

In the present embodiment, port utilization efficiency when M=14, k=2, and h=2 is as follows.

$$(2(p+k)+h)/(3p-2+k+h)$$
$$= (2 \times (4+2) + 2)/(3 \times 4 - 2 + 2 + 2)$$
$$= 14/14 = 1$$

Fourth Embodiment

Figure 7:
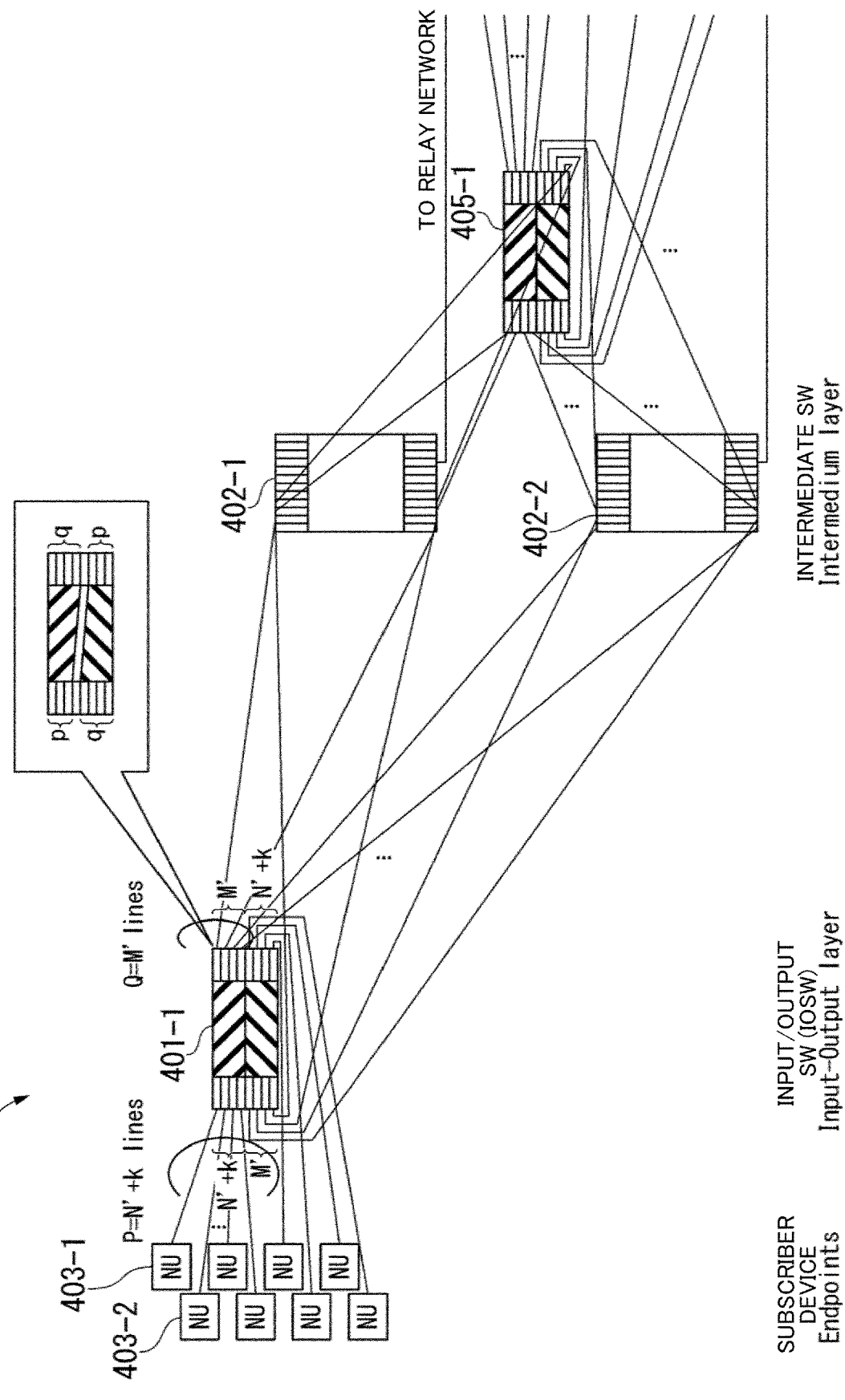
FIG. 7 is an explanatory diagram of an overview of a communication system according to a fourth embodiment of the present invention.

FIG. 7 is an explanatory diagram illustrating an overview of a communication system 400 according to a fourth embodiment of the present invention. The communication system 400 according to the fourth embodiment of the present invention is configured of input/output switches 401-1, ..., intermediate switches 402-1, 402-2, ..., subscriber equipment 403-1, 403-2, ..., and folding-back switches 405-1, ... and realizes a folded Clos network. The subscriber equipment 403-1, 403-2, ... are end points and are, for example, ONUs.

In the communication system 400 according to the fourth embodiment of the present invention, the input/output switches using the switch configuration C illustrated in FIG. 3 are used as the input/output switches 401-1, ... similarly to the aforementioned first embodiment. In other words, one switch is divided into two virtual switches as the input/output switches 401-1 ..., and further, a return port for returning between the two virtual switches is provided. Further, folding-back switches 405-1, ... that forms a path for returning some of traffics of the input/output switches 401-1, ... to the side of the relay network are provided in the present embodiment.

In this embodiment, a configuration in which some of the input/output switches in the first embodiment are folded back on the side of the relay network is employed. Note that the number of folding-back switch 405-1 depends on a ratio of connection lines to the relay network. Although the folding-back is achieved in units of input/output switches, it may be achieved in units of ports on the subscription side. Note that as illustrated in the drawing, the ports that are coupled directly to the relay network from the intermediate switch 402 may be provided.

Fifth Embodiment

Figure 8:
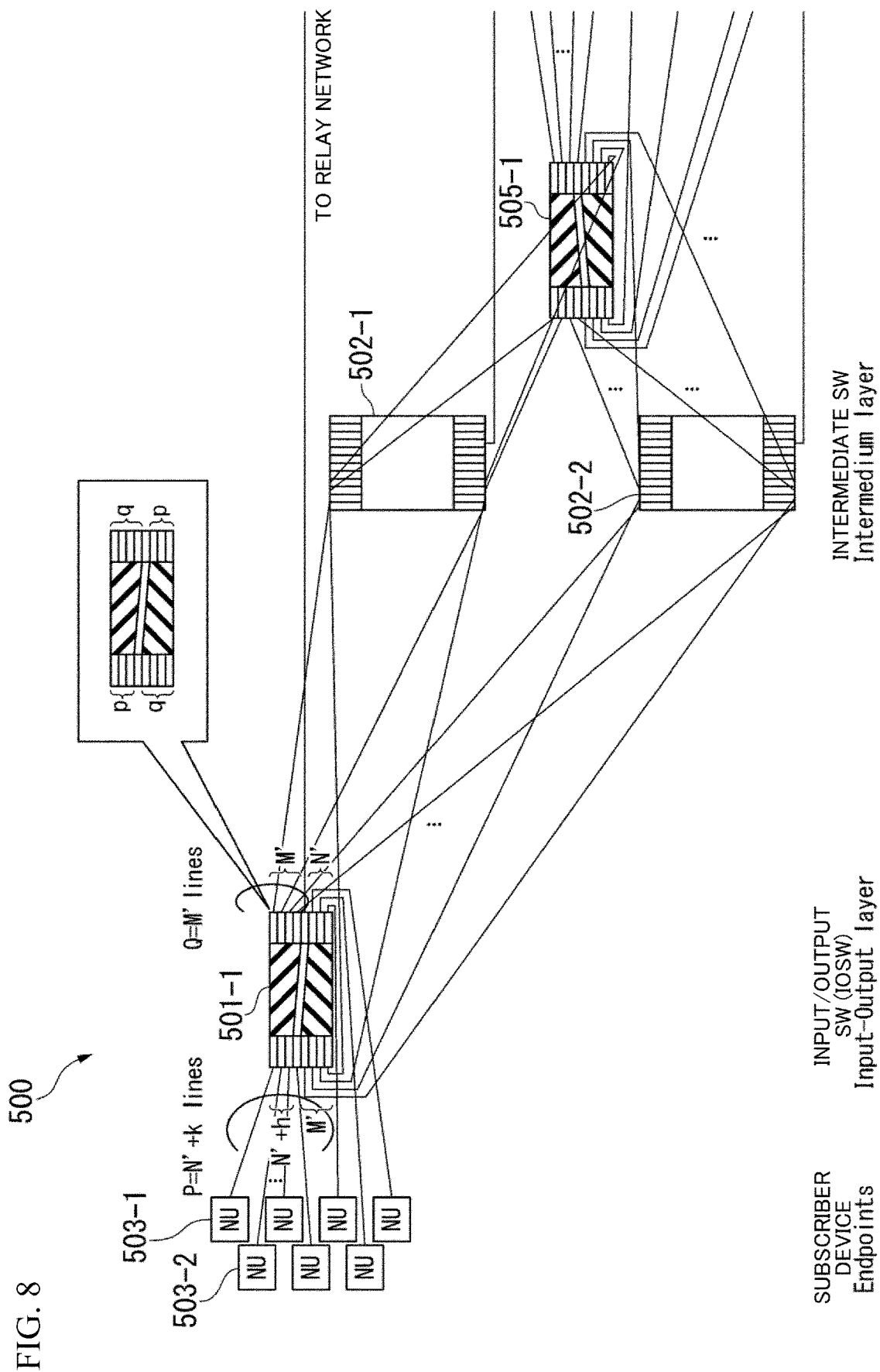
FIG. 8 is an explanatory diagram of an overview of a communication system according to a fifth embodiment of the present invention.

FIG. 8 is an explanatory diagram illustrating an overview of a communication system 500 according to a fifth embodiment of the present invention. The communication system 500 according to the fifth embodiment of the present invention is configured of input/output switches 501-1, ..., intermediate switches 502-1, 502-2, . . . , subscriber equipment 503-1, 503-2, . . . , and folding-back switches 505-1, . . . and realizes a folded Clos network. The subscriber equipment 503-1, 503-2, . . . are end points and are, for example, ONUs.

In the communication system 500 according to the fifth embodiment of the present invention, input/output switches that are similar to those in the second embodiment illustrated in FIG. 5 are used as the input/output switches 501-1 . . . , Further, folding-back switches 505, . . . that form a path for folding back some of the input/output switches 501-1, . . . on the side of the relay network are provided in the present embodiment, In the present embodiment, a configuration in which some of the input/output switches in the second embodiment are folded back on the side of the relay network is employed. The number of the folding-back switches 505-1, . . . depends on a ratio of connection lines to the relay network. Although the folding-back is achieved in units of input/output switches, it may be achieved in units of ports on the subscription side. In the present embodiment, it is possible to reduce utilization of ports to the intermediate switches that are about a double of the subscriber ports and thereby to achieve high utilization efficiency by providing ports coupled directly to the relay network from the subscriber equipment. Note that as illustrated in the drawing, the ports that are coupled directly to the relay network from the intermediate switch 502 may be provided.

Sixth Embodiment

Figure 9:
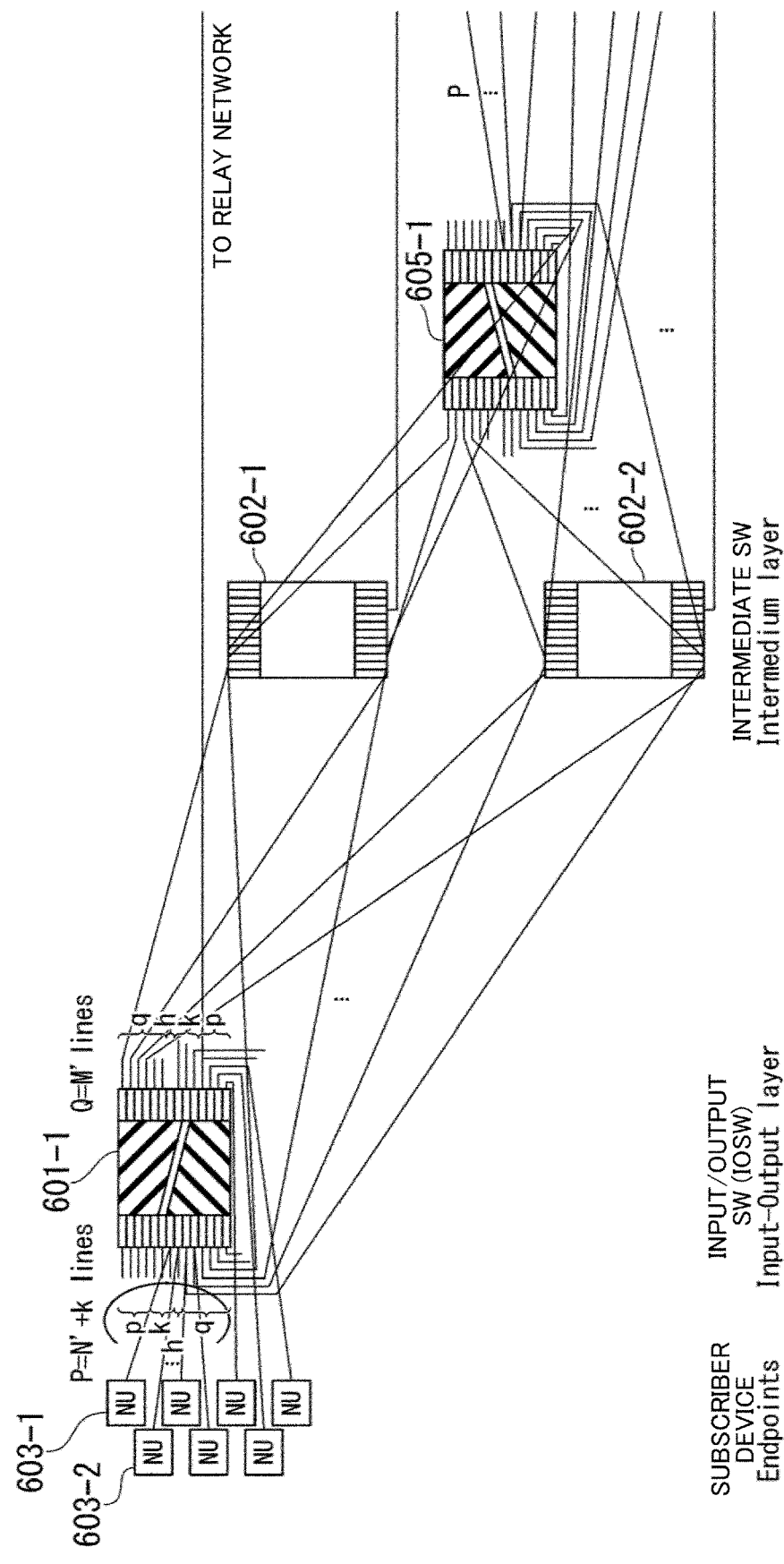
FIG. 9 is an explanatory diagram of an overview of a communication system according to a sixth embodiment of the present invention.

FIG. 9 is an explanatory diagram illustrating an overview of a communication system 600 according to a sixth embodiment of the present invention. The communication system 600 according to the sixth embodiment of the present invention includes input/output switches 601-1, . . . , intermediate switches 602-1, 602-2, . . . , subscriber equipment 603-1, 603-2, . . . , and folding-back switches 605-1, . . . and realizes a folded Clos network. The subscriber equipment 603-1, 603-2, . . . are end points and are, for example, ONUs.

In the communication system 600 according to the sixth embodiment of the present invention, input/output switches that are similar to those in the third embodiment illustrated in FIG. 6 are used as the input/output switches 601-1, 601-2, . . . . Moreover, folding-back switches 605-1, . . . that form a path for folding back some of traffics of the input/output switches 601-1, 601-2, . . . on the side of the relay network are provided in the present embodiment. Configurations of the folding-back switches 605-1, . . . are similar to those in the fourth embodiment and the fifth embodiment described above.

In the present embodiment, a configuration in which some of the input/output switches in the third embodiment are folded back on the side of the relay network is employed. The number of folding-back switches 605-1, . . . depends on a ratio of connection lines to the relay network. Although the folding-back is achieved in units of input/output switches, it may be achieved in units of ports on the subscription side.

In the present embodiment, it is possible to reduce utilization of ports to the intermediate switches that are about a double of the subscriber ports and thereby to achieve high utilization efficiency by providing ports coupled directly to the relay network from the subscriber equipment. Note that as illustrated in the drawing, the ports that are coupled directly to the relay network from the intermediate switch 702 may be provided.

Seventh Embodiment

Figure 10:
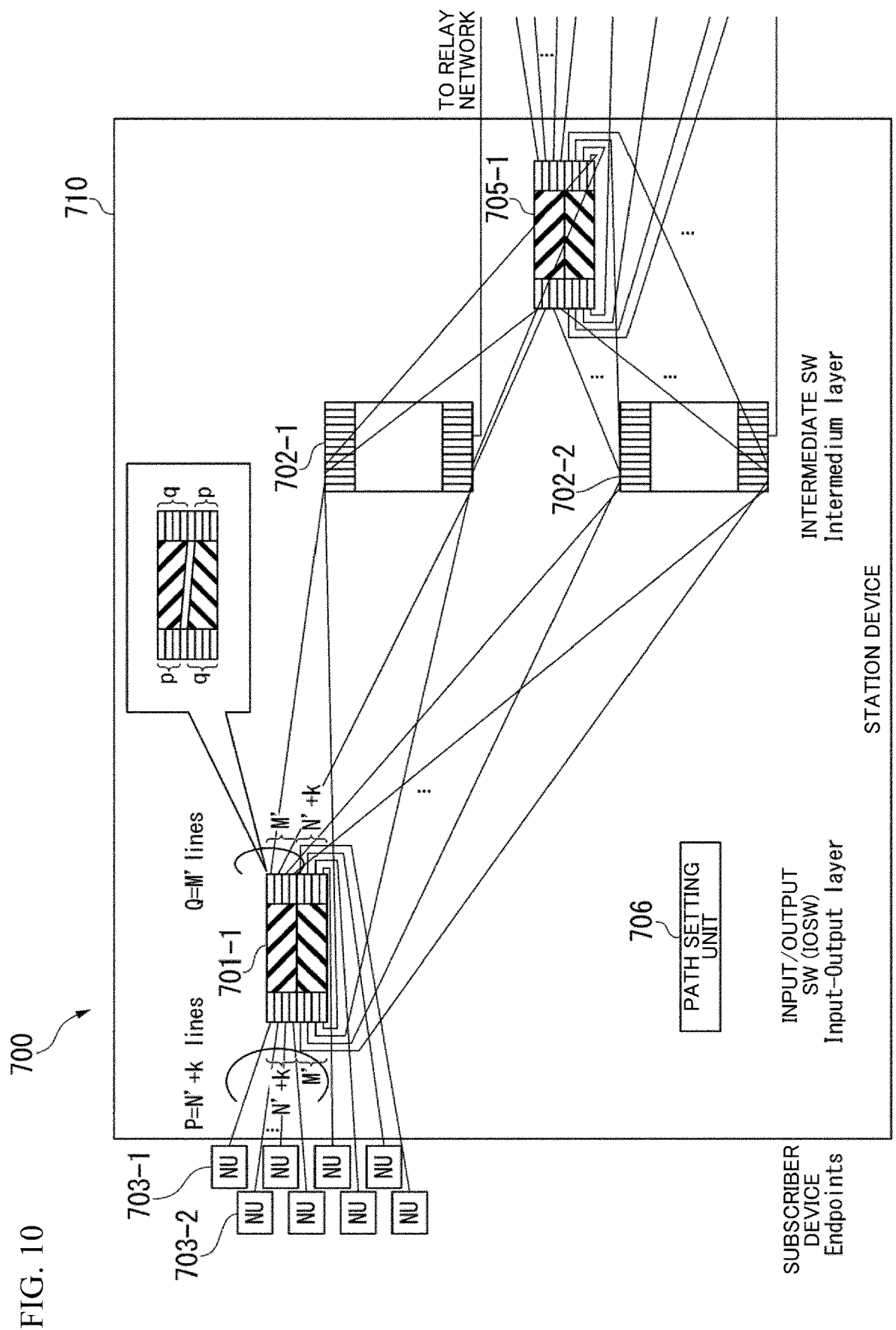
FIG. 10 is an explanatory diagram of an overview of a communication system according to a seventh embodiment of the present invention.

FIG. 10 is an explanatory diagram of an overview of a communication system 700 according to a seventh embodiment of the present invention. The communication system 700 according to the seventh embodiment of the present invention is configured of input/output switches 701-1 . . . , intermediate switches 702-1, 702-2, . . . , subscriber equipment 703-1, 703-2, . . . , folding-back switches 705-1 . . . , and a path setting unit (path setter) 706 and realizes a folded Clos network.

The path setting unit 706 sets a path for each switch (the input/output switches 701, the intermediate switches 702, or the folding-back switches 705). Specific description is as follows. The path setting unit 706 sets paths for establishing connection of the subscriber equipment 703 to the ports of the subscriber equipment 703 and the relay network and the intermediate switches 702, in regard to the input/output switches 701. The path setting unit 706 sets paths for establishing connection of the input/output switches 701 to the ports of the input/output switches 701 and the relay network, in regard to the intermediate switches 702. The path setting unit 706 performs such setting to realize communication of the subscriber equipment 703 accommodated in a desired input/output switch 701 or a virtual SW and communication between the subscriber equipment 703 and counterpart devices with an intervention of the relay network, through such processing. The path setting may be performed by designating all the paths, may be performed by designating counterpart devices or a network, or may be performed such that connection in accordance with corresponding information included in a station device 710 or another device is established.

An instruction for establishing the connection may be received from another management device, another system, or the like or may be received from the subscriber equipment 703. In the case in which the instruction is received from the subscriber equipment 703, the instruction may be received through communication performed at the time of initial connection or at the time of a change in setting, or the instruction may be included in a part of signals exchanged in the communication. As the included instruction, addresses of a transmission source and a transmission destination in an Ethernet frame or an IP packet may be used.

According to an instruction from a subscriber device, a path is set such that the instruction reaches a path setting function at the time of initial connection or a change, information regarding a desired path, a communication counterpart, and the like is acquired through exchange with a path setting function and a wavelength setting function, a wavelength and the like are set for the subscriber device in a case in which the wavelength and the like are set for the subscriber device in accordance with the acquired information, or wavelengths and the like are set for devices and functions included in the path in a case in which the wavelengths and the like are set for the devices and the functions, and the path setting function sets the path such that a path in accordance with the desired path, the communication counterpart, and the like is obtained.

An example in which request or an instruction for establishing connection with an optical signal from subscriber equipment is provided will be described. The request or the instruction from the subscriber equipment may be received by a switch or a device, a control unit or a control system thereof, or a function that transmits signals thereto via a port of the input/output switch, the intermediate switch, or the relay network or a dedicated port thereof, or may be acquired by including a monitor that acquires the signals at any location of the port or the switch, Note that the monitor may branch a part of the path, perform photoelectric conversion thereof, and terminate it, or conduction of the optical signal may be acquired as a variation in gain or a variation in applied voltage or applied current of an element using a semiconductor optical amplifier (SOA), a supersaturated absorber, or the like. In the case of the reception, the instruction for setting the wavelength and the like for the subscribers may be provided through ordinary communication via a function of transmitting signals. In a case in which communication has already been performed with a monitor or any ground, a control function may insert signal light into a path connected to the subscribers via a combiner/splitter or a multiplexer/demultiplexer for the subscriber equipment, or an instruction for signal light that is being communicated with any ground may be provided through a variation in gain such as SOA, supersaturated absorption pair, or the like, a variation in an applied voltage or current of an element, or modulation achieved by a modulator.

The setting unit sets the path such that the request or the instruction reaches the setting unit in a case in which the setting unit, for example, receives the request or the instruction, or the path that can be monitored is set in a case in which the setting unit receives it through monitoring. Then, the setting unit receives or monitors the request or the instruction and sets a path through which the subscriber device can communicate with the communication counterpart in accordance with the request or the instruction.

The control unit sets the path such that the request or the instruction reaches the setting unit in a case in which the setting unit, for example, transmits/receives the request or the instruction, or the control unit sets the path such that it passes through the monitor or a path that allows insertion or modulation of the instruction in a case in which the control unit transmits/receives it through monitoring. Then, when the control unit receives or monitors the request or the instruction, reception confirmation, and the like from the subscriber device, a control device transmits wavelength setting or the like to the subscriber device, and transmission/reception to and from the subscriber device is completed, the control device sets a communication counterpart in accordance with the request or the instruction and a path through which the subscriber device can establish communication. The wavelength setting or the like is setting of a wavelength, a transmission speed, a modulation scheme, a code, MAC, user data (analog/digital, a continuous signal/frame, a frame form (Ethernet (registered trademark)/OTN or the like), a control scheme (MPLS or the like) of the subscriber device, addresses of the subscriber device and the counterpart device (MAC addresses, IP addresses, VLAN tags, or VXLAN tags), polarization used in polarization multiplexing, a mode used in mode division multiplexing, a core number at the time of using a multi-core fiber, transmission paths at the time of using a plurality of transmission paths, a redundant configuration, and a vendor specific region in OAM or the like.

A case in which a function of monitoring signals (hereinafter, referred to as a "monitoring function") is included in the course of the path will be described. In this case, the monitoring function acquires a request for setting or changing a path, a wavelength, or the like and transfers the request to a path setting unit 706 or a wavelength setting function. When the request for the setting or the changing relates to a path, the path setting unit 706 changes the path in accordance with the request. When the request for the changing relates to a wavelength, it is possible to change the wavelength without changing the path, and the change does not affect other devices, the wavelength setting function changes the wavelength. On the other hand, in a case in which the change affects other devices, the station device 710 stops transferring of signals, or changes the path to a path that does not affect other devices, changes the wavelength and the like, and returns the path after completion of the change. In a case in which an instruction for the changing or the like cannot be provided without communication with the path setting unit 706, the path is changed such that communication with the path setting function is performed similarly to the path at the time of initial connection, and the path is then returned.

The seventh embodiment of the present invention realizes the communication system according to the fourth embodiment illustrated in FIG. 7 as the station device 710. In this case, port connection of the input/output switches 701-1 . . . . On the side of the subscriber devices may be achieved by a single subscriber device or on a drop side of a star-type double start (PDS) or a bus-type or a ring-type add drop multiplexer (ADM), or may be a part of the subscriber ring in a single station device, or may be a ring via a station-side device or a relay network through connection to an end the subscriber ring in each of a plurality of station-side devices. The station device 710 may be configured as an optical gateway, for example.

The station device may form a larger virtual station device through ring or mesh connection, or the station device or the virtual station device may configure a network, for example, an optical full-mesh network through mesh (in a case of four grounds, physical or logical connection with three grounds) connection or through ring-configuration (connection with two leftward and rightward grounds in a case of a single ring, and connection with grounds in accordance with a ring configuration in a case of multiple rings) connection with the ground station device.

Light may be folded back by the ports of the input/output switches 701-1, . . . on the side of the intermediate switch, inputs/outputs to the ports may be combined/split by a splitter such as a power/wavelength division multiplexing (WDM) or the like, or passing through the same switches in latch connection may be employed. Intervention of a device that performs OE/EO (optical/electrical) conversion may be provided in the course of the latch connection.

The node may be a node in an optical full-mesh network or an optical node called a photonic gateway (GW, PhGW) in which an access plane and a local full-mesh plane are connected and electric processing such as packet conversion and multiplexing/switch control are minimized to achieve relay or to provide an optical path for each service in an end-to-end manner.

In the case of the photonic gateway, wavelength management control may be included, a management control signal may be superimposed as an auxiliary management and control channel (AMCC) on a low-frequency band that does not interfere with a user signal to provide a notification with the same wavelength, or a notification may be provided in a frame including user data as a payload. Switching control may be performed with before connection of the input/output switch/subscription ports thereof, with Tap/input/output switch intermediate ports/input/output switch intermediate ports, and with Tap/intermediate switch/outside the station device/on the side of the relay network. The switching may be performed in units of routes or may be performed in combination of a route, a wavelength, a frequency, a sign, and the like. Note that as illustrated in the drawing, the ports that are coupled directly to the relay network from the intermediate switch 702 may be provided.

Eighth Embodiment

FIG. 11 is an explanatory diagram of an overview of a communication system 800 according to an eighth embodiment of the present invention. The communication system 800 according to the eighth embodiment of the present invention is configured of input/output switches 801-1, . . . , intermediate switches 802-1, 802-2, . . . , subscriber equipment 803-1, 803-2, . . . , folding-back switches 805-1, . . . , and a path setting unit 806 and realizes a folded Clos network. The eighth embodiment of the present invention realizes the communication system according to the fourth embodiment of the present invention as a station device 810. The station device 810 may be configured as an optical gateway, for example. The path setting unit 806 is configured similarly to the path setting unit 706. Note that as illustrated in the drawing, the ports that are coupled directly to the relay network from the intermediate switch 802 may be provided.

Ninth Embodiment

Figure 12:
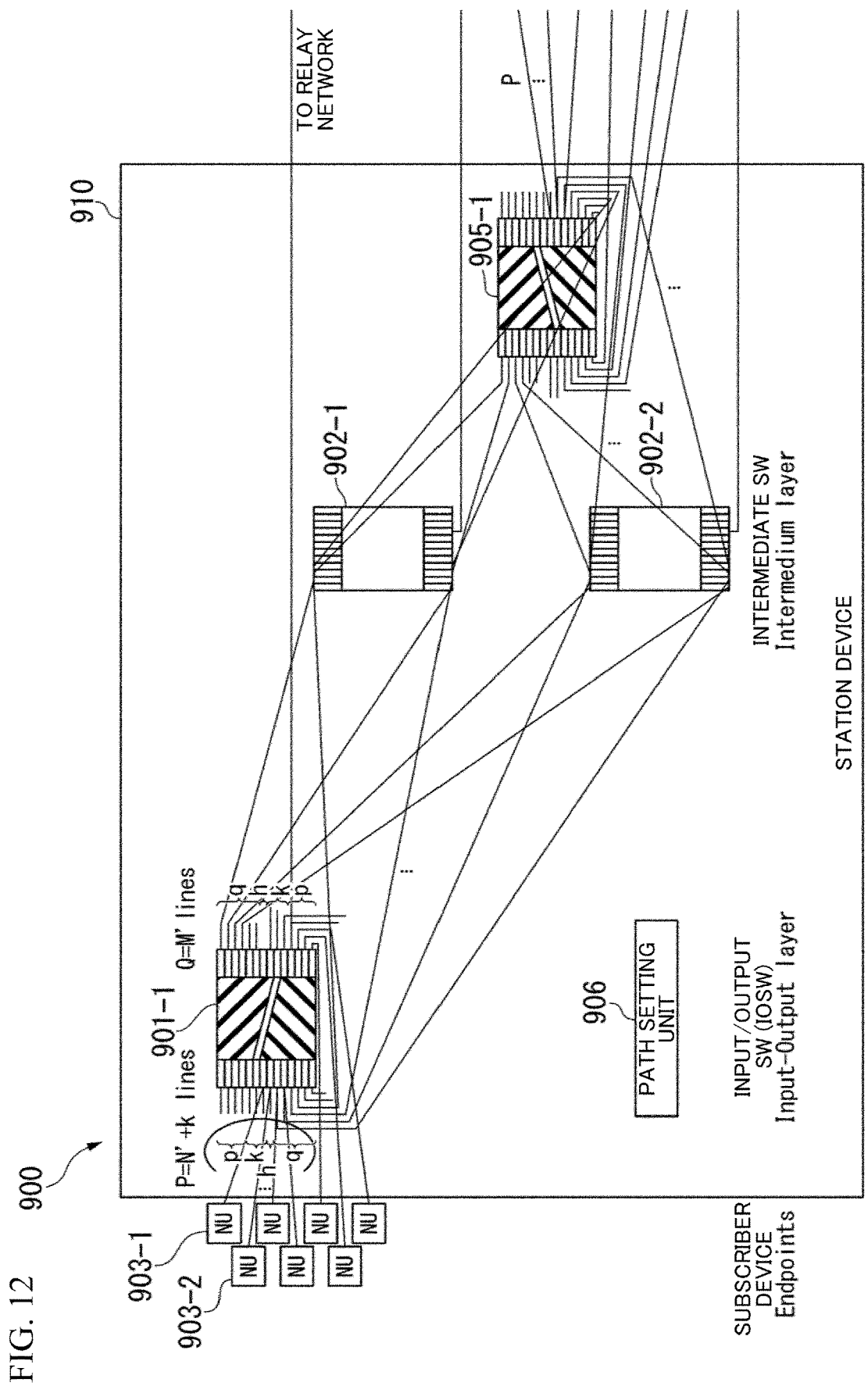
FIG. 12 is an explanatory diagram of an overview of a communication system according to a ninth embodiment of the present invention.

FIG. 12 is an explanatory diagram of an overview of a communication system 900 according to a ninth embodiment of the present invention. The communication system 900 according to the ninth embodiment of the present invention is configured of input/output switches 901-1, . . . , intermediate switches 902-1, 902-2, . . . , subscriber equipment 903-1, 903-2, . . . , folding-back switches 905-1, . . . , and a path setting unit 906 and realizes a folded Clos network. The ninth embodiment of the present invention realizes the communication system according to the fifth embodiment of the present invention as a station device 910. The station device 910 may be configured as an optical gateway, for example. The path setting unit 906 is configured similarly to the path setting unit 706. Note that as illustrated in the drawing, the ports that are coupled directly to the relay network from the intermediate switch 902 may be provided.

Tenth Embodiment

Figure 13:
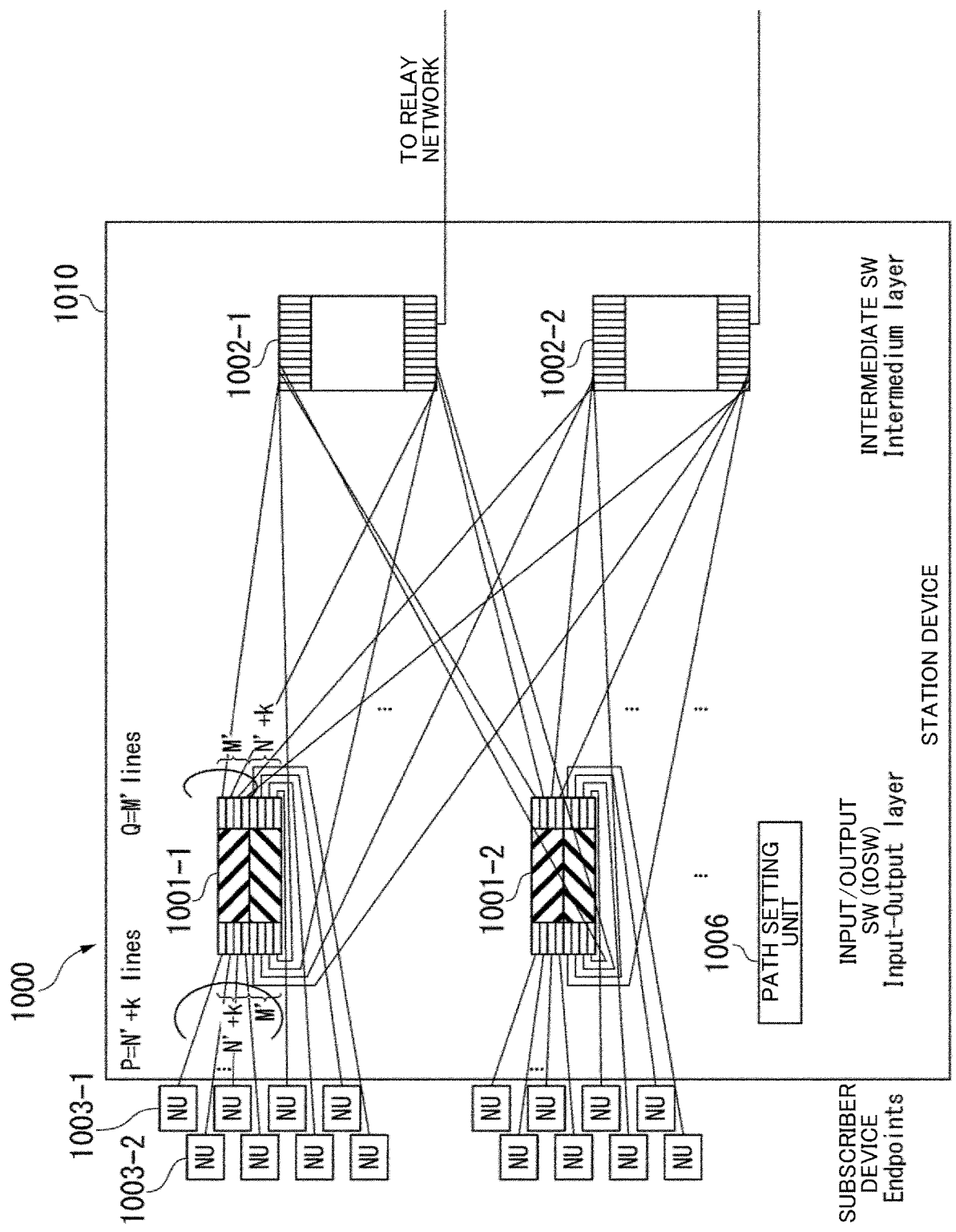
FIG. 13 is an explanatory diagram of an overview of a communication system according to a tenth embodiment of the present invention.

FIG. 13 is an explanatory diagram of an overview of a communication system 1000 according to a tenth embodiment of the present invention. The communication system 1000 according to the tenth embodiment of the present invention is configured of input/output switches 1001-1, . . . , intermediate switches 1002-1, 1002-2, . . . , subscriber equipment 1003-1, 1003-2, . . . , and a path setting unit 1006 and realizes a folded Clos network. The tenth embodiment of the present invention realizes the communication system according to the first embodiment of the present invention as a station device 1010. The station device 1010 may be configured as an optical gateway, for example. The path setting unit 1006 is configured similarly to the path setting unit 706. Note that as illustrated in the drawing, the ports that are coupled directly to the relay network from the intermediate switch 1002 may be provided.

Eleventh Embodiment

Figure 14:
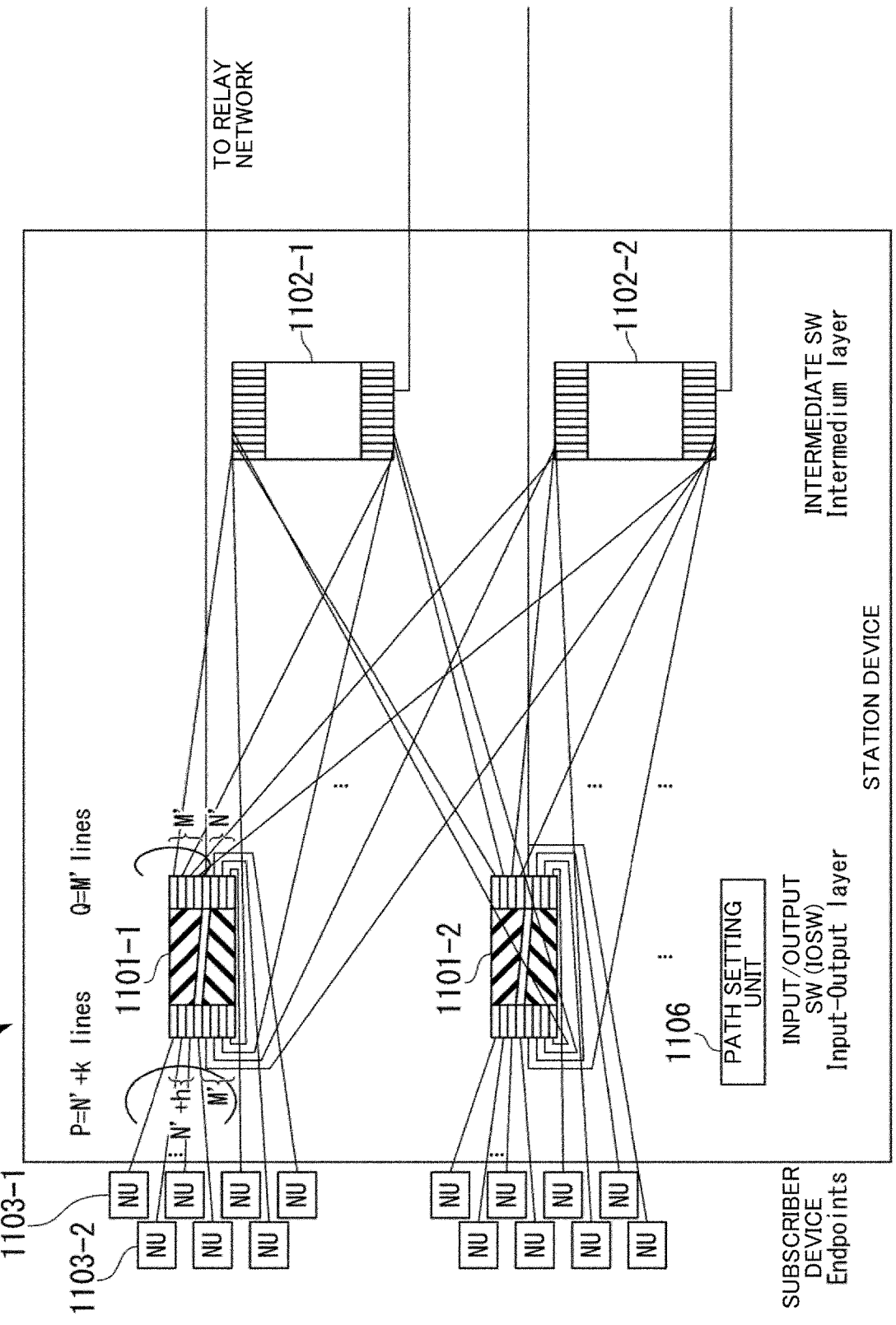
FIG. 14 is an explanatory diagram of an overview of a communication system according to an eleventh embodiment of the present invention.

FIG. 14 is an explanatory diagram of an overview of a communication system 1100 according to an eleventh embodiment of the present invention. The communication system 1000 according to the eleventh embodiment of the present invention is configured of input/output switches 1101-1 intermediate switches 1102-1, 1102-2, . . . , subscriber equipment 1103-1, 1103-2, . . . , and a path setting unit 1106 and realizes a folded Clos network. The eleventh embodiment of the present invention realizes the communication system according to the second embodiment of the present invention as a station device 1110. The station device 1110 may be configured as an optical gateway, for example. The path setting unit 1106 is configured similarly to the path setting unit 706. Note that as illustrated in the drawing, the ports that are coupled directly to the relay network from the intermediate switch 1102 may be provided.

Twelfth Embodiment

Figure 15:
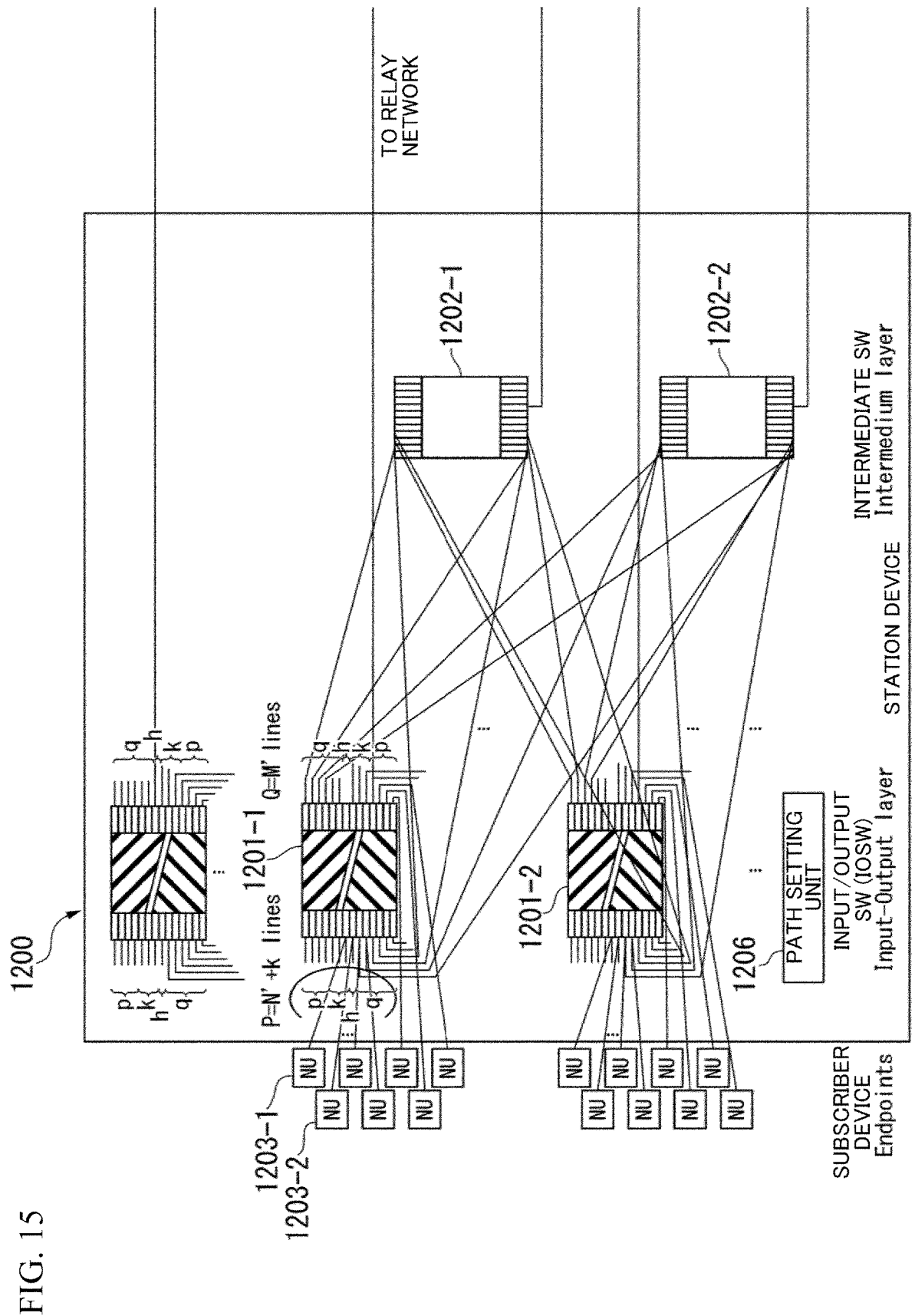
FIG. 15 is an explanatory diagram of an overview of a communication system according to a twelfth embodiment of the present invention.

FIG. 15 is an explanatory diagram of an overview of a communication system 1200 according to a twelfth embodiment of the present invention. The communication system 1200 according to the twelfth embodiment of the present invention is configured of input/output switches 1201-1, . . . , intermediate switches 1202-1, 1202-2, . . . , subscriber equipment 1203-1, 1203-2, . . . , and a path setting unit 1206 and realizes a folded Clos network. The twelfth embodiment of the present invention realizes the communication system according to the third embodiment of the present invention as a station device 1210. The station device 1210 may be configured as an optical gateway, for example. The path setting unit 1206 is configured similarly to the path setting unit 706. Note that as illustrated in the drawing, the ports that are coupled directly to the relay network from the intermediate switch 1202 may be provided.

As described above, it is possible to improve port utilization efficiency in a case in which a folded Clos network for performing transferring in a non-blocking manner is configured in the present embodiment.

Each of the aforementioned switches may be configured using a processor such as a central processing unit (CPU) and a memory. In this case, each of the aforementioned switches operates by the processor executing a program. Note that all or some of the functions of each switch may be realized using hardware such as an application specific integrated circuit (ASIC), a programmable logic device (PLD), or a field programmable gate array (FPGA). The aforementioned program may be recorded in a computer-readable recording medium. The computer-readable recording medium is a storage device, for example, a portable medium such as a flexible disk, a magneto-optical disk, a ROM, a CD-ROM, or a semiconductor storage device (a solid state drive (SSD), for example), or a hard disk, a semiconductor storage device, or the like incorporated in a computer system. The aforementioned program may be transmitted via an electric communication line.

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention can be applied to a folded Clos network.

REFERENCE SIGNS LIST

11, 21, 31 Input/output switch
22*a*, 22*b*, 33*a*, 33*b* Virtual switch 101, 201, 301, 401, 501, 601, 701, 801, 901, 1001, 1101, 1201 Input/output switch
102, 202, 302, 402, 502, 602, 702, 802, 902, 1002, 1102, 1202 Intermediate switch
103, 203, 303, 403, 503, 603, 703, 803, 903, 1003, 1103, 1203 Subscriber device

The invention claimed is:

1. An input/output switch comprising:
a plurality of virtual switches formed by asymmetrically divided switches with symmetrically aligned ports; and
ports on a side of end points and ports on a side of an intermediate switch aligned for each of the virtual switches,
wherein some of the ports of the virtual switches on the side of the end points act as ports that form a path that returns traffic among the virtual switches and some of the ports on the side of the intermediate switch function as ports that form the path directly coupled to the relay network, the path being formed with no intervention of the intermediate switch.

2. A communication system comprising a folded Clos network that includes the input/output switch according to claim 1.

3. The communication system according to claim 2, further comprising a switch that returns a part of traffic of the input/output switch to a side of the relay network.

4. An input/output switch comprising:
a plurality of virtual switches formed by asymmetrically divided switches with symmetrically aligned ports; and
ports on a side of end points and ports on a side of an intermediate switch aligned for each of the virtual switches,
wherein some of the ports of the virtual switches on the side of the end points function as ports that form a path directly coupled to a relay network and some of the ports on the side of the intermediate switch function as ports that form the path directly coupled to the relay network, the path being formed with no intervention of the intermediate switch.

5. An input/output switch comprising:
a plurality of virtual switches formed by asymmetrically divided switches with symmetrically aligned ports; and
ports on a side of end points and ports on a side of an intermediate switch aligned for each of the virtual switches,
wherein some of the ports of the virtual switches on the side of the end points act as ports that form a first path that returns traffic among the virtual switches, the first path being formed with no intervention of the intermediate switch, and
some of the ports of the virtual switches on the side of the end points act as ports that form a second path directly coupled to a relay network and some of the ports on the side of the intermediate switch act as ports that form a third path directly coupled to the relay network, the second path being formed with no intervention of the intermediate switch.

* * * * *